(12) United States Patent
Shirai (10) Patent No.: US 9,126,651 B2
(45) Date of Patent: Sep. 8, 2015

(54) BICYCLE SUSPENSION ADJUSTOR (75) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 1529 days.

(21) Appl. No.: 12/717,175

(22) Filed: Mar. 4, 2010

(65) Prior Publication Data
US 2011/0215550 A1 Sep. 8, 2011

(51) Int. Cl.
B60G 13/00 (2006.01)
B62K 25/08 (2006.01)
F16F 9/512 (2006.01)
B62K 25/04 (2006.01)

(52) U.S. Cl.
CPC ........... B62K 25/08 (2013.01); B62K 2025/048 (2013.01)

(58) Field of Classification Search
CPC ...... B60G 11/14; B60G 2400/252; F16F 9/56
USPC ................. 188/266.1, 266.2, 299.1; 280/276, 280/5.515; 251/129.11, 255, 256; 74/422, 74/388 PS
See application file for complete search history.

(56) References Cited

U.S. PATENT DOCUMENTS

| 3,984,119 | A | | 10/1976 | Okazima | |
|---|---|---|---|---|---|
| 5,060,959 | A | * | 10/1991 | Davis et al. | 280/5.514 |
| 5,947,498 | A | | 9/1999 | Rajaee | |
| 6,105,988 | A | | 8/2000 | Turner et al. | |
| 6,360,858 | B2 | | 3/2002 | Gonzalez et al. | |
| 6,491,146 | B1 | * | 12/2002 | Yi et al. | 188/319.2 |
| 6,592,136 | B2 | | 7/2003 | Becker et al. | |
| 7,147,207 | B2 | | 12/2006 | Jordan et al. | |
| 7,163,222 | B2 | | 1/2007 | Becker et al. | |
| 8,042,818 | B2 | * | 10/2011 | Yamawaki et al. | 280/5.515 |
| 2009/0079145 | A1 | * | 3/2009 | Inoue et al. | 280/5.515 |
| 2009/0108546 | A1 | * | 4/2009 | Ohletz et al. | 280/6.16 |
| 2009/0121398 | A1 | * | 5/2009 | Inoue | 267/140.14 |
| 2009/0255768 | A1 | * | 10/2009 | Inoue | 188/313 |
| 2010/0066051 | A1 | * | 3/2010 | Haugen | 280/124.157 |
| 2011/0012317 | A1 | * | 1/2011 | Mouri et al. | 280/5.519 |

FOREIGN PATENT DOCUMENTS

| DE | 2 239 444 A1 | | 2/1973 |
|---|---|---|---|
| DE | 197 01 759 A1 | | 10/1997 |
| DE | 102010022504 A1 | * | 3/2011 |
| EP | 1 826 453 A1 | | 8/2007 |
| WO | WO 99/03721 A1 | | 1/1999 |

* cited by examiner

Primary Examiner — Robert A Siconolfi
Assistant Examiner — Mahbubur Rashid
(74) Attorney, Agent, or Firm — Global IP Counselors (57) ABSTRACT A bicycle suspension adjustor is provided with a rotational input member, an axial output member and a rotation-to-axial movement converting structure. The rotation-to-axial movement converting structure includes a first converting member operatively coupled to a rotational input member and a second converting member facing the first converting member. At least one rolling member is operatively disposed between the first and second converting members. One of the converting members is operatively coupled to an axial output member. The rolling member is in rolling contact with the first and second converting members so that the rolling member induces relative displacement with respect to both of the first and second converting members as the rotational input member rotates the first converting member in response to a rotational movement of the rotational input member.

16 Claims, 11 Drawing Sheets

BICYCLE SUSPENSION ADJUSTOR

BACKGROUND

1. Field of the Invention

This invention generally relates to a bicycle suspension for operating a bicycle component. More specifically, the present invention relates to a bicycle suspension that has a bicycle suspension adjustor for changing a suspension operating condition of the bicycle suspension.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames which typically transmitted the shocks resulting from rough riding surfaces directly to the rider. In other words, most bicycles were not provided with any front or rear suspension. Recently, bicycles, especially mountain bikes (MTB) and all terrain bikes (ATB), have been outfitted with front and/or rear suspension assemblies to absorb the shocks transmitted to the rider when riding on a rough road.

The first suspension forks had about 1½ to 2 inches (38 to 50 mm) of suspension travel. Forks are now available with about 4 to 6 inches (100 to 150 mm) of suspension travel or more. On most mountain bicycles, the front fork contains a set of shock absorbers. The suspension travel and handling characteristics vary depending on the type of mountain biking the fork is designed for. For instance, bicycle manufacturers produce different forks for cross-country (XC), downhill and freeride riding.

The shock absorber usually includes a spring and a damper or dashpot. The spring can be implemented with a steel or titanium coil, an elastomer, or even compressed air. The damper is usually implemented by forcing oil to pass through one or more small openings or shim stacks. On some bicycles, the spring, the damper, or both may be adjusted for rider weight, riding style, terrain, or any combination of these or other factors. Also, the two components are sometimes separated with the spring mechanism being in one leg and the damper being in the other leg. In these bicycles with front suspension forks, it is sometimes desirable to be able to adjust the suspension stroke, adjust the spring rate of the spring mechanism, adjust a damping force, and/or lockout the suspension, as needed and/or desired. Thus, there have been proposals to provide suspensions that include adjustors for adjusting the suspension stroke and/or the spring rate of the spring mechanism.

SUMMARY

According to one aspect of the present invention, a bicycle suspension adjustor is provided for converting a rotational input to an axial output that requires minimal amount of force as compared to prior bicycle suspension adjustors.

In view of the above, a bicycle suspension adjustor is provided that mainly comprises a rotational input member, an axial output member and a rotation-to-axial movement converting structure. The rotational input member is configured to rotate in a rotational direction. The axial output member is configured to move in an axial direction. The rotation-to-axial movement converting structure includes a first converting member operatively coupled to the rotational input member, a second converting member facing the first converting member. At least one rolling member is operatively disposed between the first and second converting members. One of the first and second converting members is operatively coupled to the axial output member. At least one of the first and second converting members has a camming surface which contacts with the at least one rolling member. The at least one rolling member is in rolling contact with the first and second converting members so that the at least one rolling member induces relative displacement with respect to both of the first and second converting members as the rotational input member rotates the first converting member in response to a rotational movement of the rotational input member with the one of the first and second converting members moving in the axial direction due to a rotational movement of the first converting member, and with the axial output member moving in the axial direction due to an axial movement of the one of the first and second converting members.

In addition to the above mentioned aspect, other objects, features, aspects and advantages of the present invention will become apparent to those skilled in the art from the following detailed description, which, taken in conjunction with the annexed drawings, discloses one embodiment.

BRIEF DESCRIPTION OF THE DRAWINGS

Referring now to the attached drawings which form a part of this original disclosure.

DETAILED DESCRIPTION OF THE EMBODIMENTS

A selected embodiment will now be explained with reference to the drawings. It will be apparent to those skilled in the art from this disclosure that the following descriptions of the illustrated embodiment is provided for illustration only and not for the purpose of limiting the invention as defined by the appended claims and their equivalents.

Figure 1:
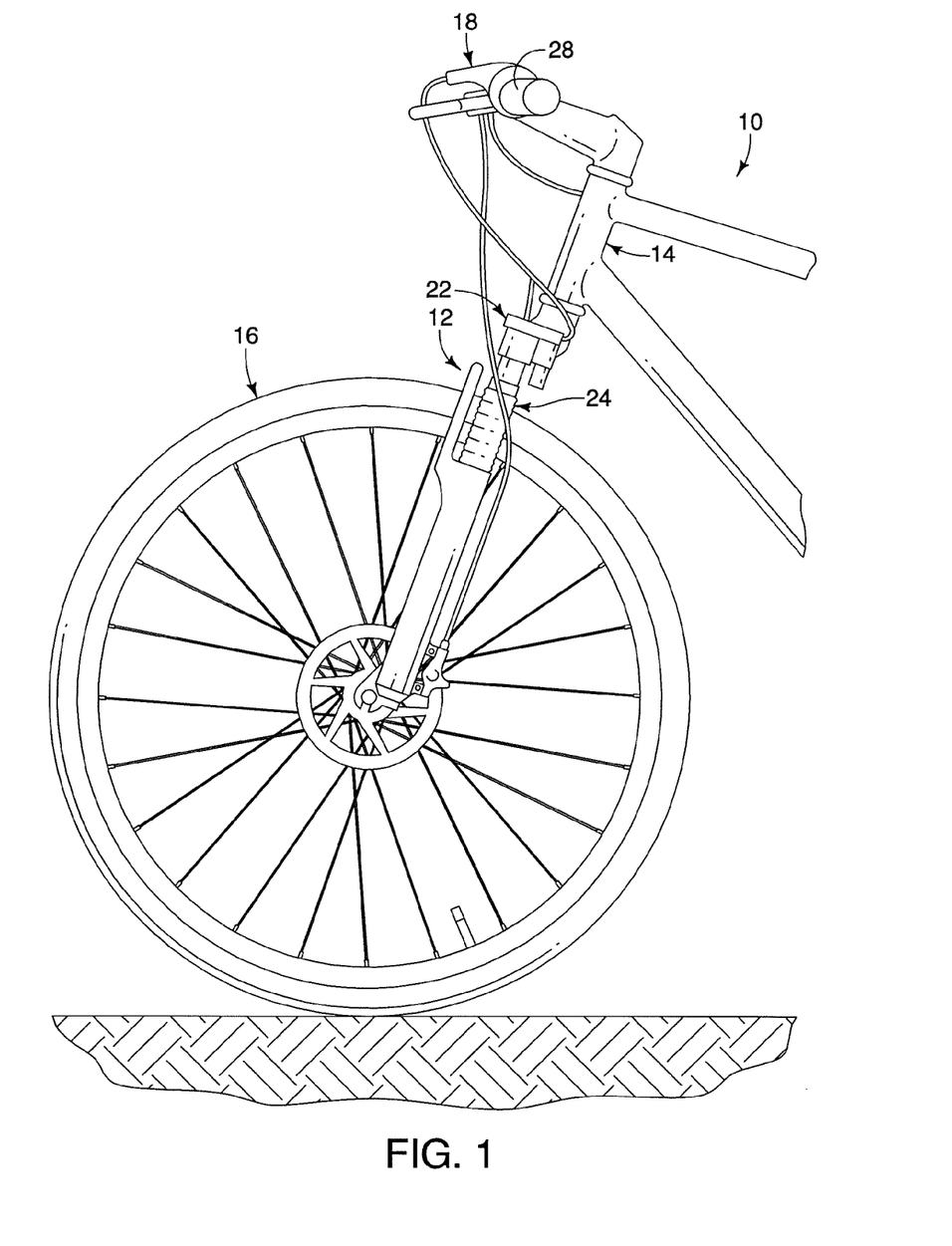
FIG. 1 is a partial side elevational view of a front portion of a bicycle with a front suspension that is equipped with a bicycle suspension adjustor in accordance with one illustrated embodiment.

Referring initially to FIG. 1, a bicycle 10 is illustrated that is equipped with a front suspension fork 12. Basically, the front suspension fork 12 has an upper end that is rotatably mounted to a front part (head tube) of a bicycle frame 14 in a conventional manner, and a lower end that rotatably supports a front wheel 16. A control device 18 is mounted on the handlebar for adjusting an operational characteristic of the front suspension fork 12 as discussed below. The rest of the bicycle 10 can be any type of bicycle, and thus, the rest if the bicycle 10 will not be discussed or illustrated in further detail herein.

Figure 2:
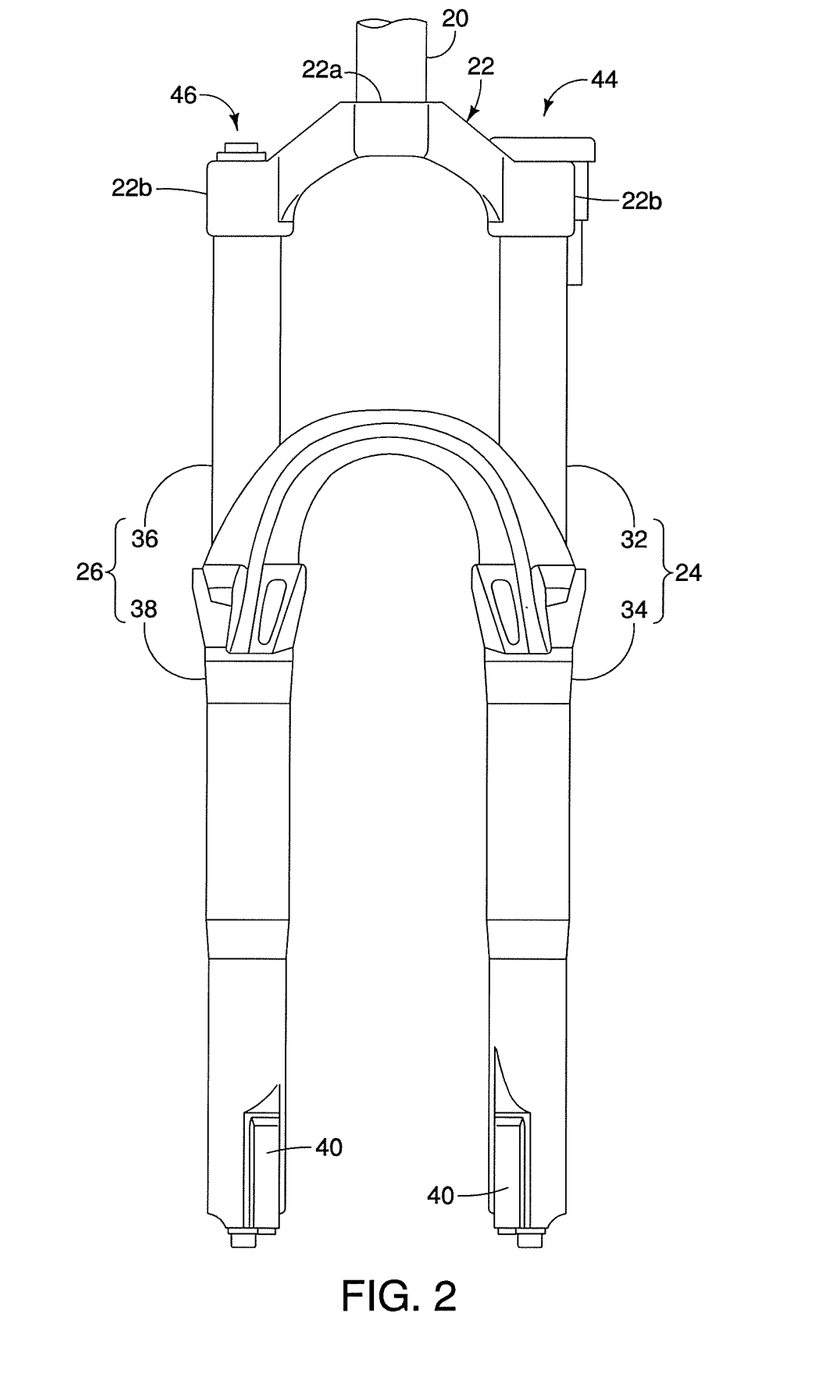
FIG. 2 is a front elevational view of the front suspension of the bicycle illustrated in FIG. 1.

As seen in FIG. 2, the front suspension fork 12 basically includes a steerer tube 20, a crown 22, a first leg or telescopic tube 24 and a second leg or telescopic tube 26. The legs 24 and 26 expand and contract for absorbing shocks while riding the bicycle 10 over rough terrain. The first leg 24 constitutes a first suspension assembly, while the second leg 26 constitutes a second suspension assembly. The crown 22 is secured to a bottom end of the steerer tube 20. The legs 24 and 26 are secured at opposite lateral end of the crown 22. Typically, as seen in FIG. 1, a handlebar 28 of the bicycle 10 is fixedly mounted to the steerer tube 20 at its upper end for steering the front wheel 16. Thus, the steerer tube 20 provides a means for connection of the handlebar 28 to the front suspension fork 12.

The steerer tube 20 includes, for example, a metal pipe member. The steerer tube 20 is rotatably supported by the head tube of the frame 14. The top end of the steerer tube 20 is coupled to the handlebar 28. The bottom end of the steerer tube 20 is inserted in the center of the crown 22, and is secured therein using an appropriate means such as press fitting, screw fitting or welding.

The crown 22 constitutes a fork shoulder unit that includes, for example, a metal molded member. The crown 22 has a cylindrical column securing portion 22a at its center for mounting the steerer tube 20. The crown 22 also has a pair of arms 22b that extend laterally from the column securing portion 22a while also curving downward from the column securing portion 22a. The free ends of the arms 22b have cylindrical suspension mounting portions for clamping the upper ends of the legs 24 and 26, respectively.

Figure 3:
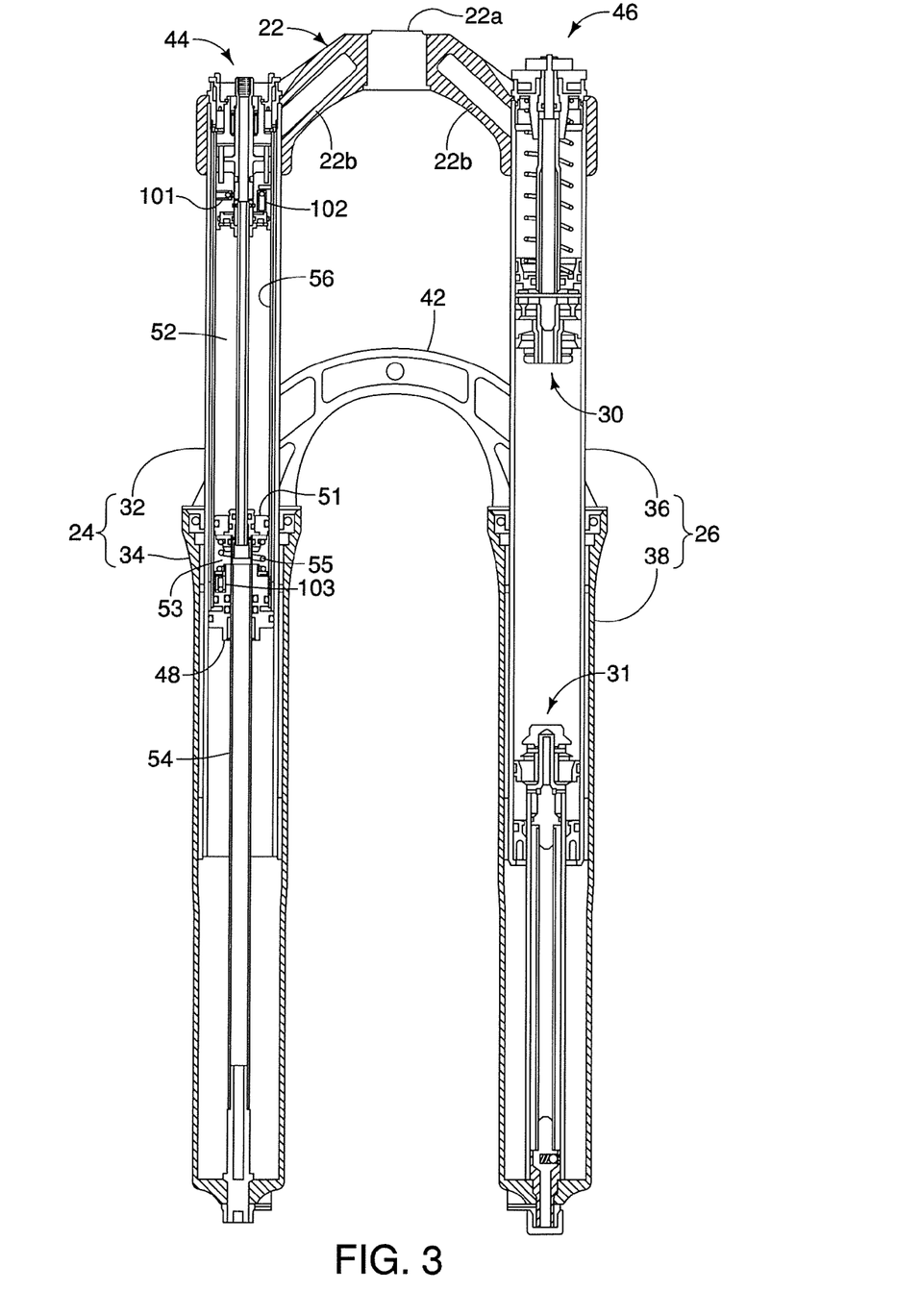
FIG. 3 is a cross sectional view of the front suspension of the bicycle illustrated in FIGS. 1 and 2.

As seen in FIG. 3, a longitudinal cross sectional view of the front suspension fork 12 is illustrated to show various internal components of the front suspension fork 12. In this illustrated embodiment, basically, the first leg 24 constitutes an air-spring mechanism of the front suspension fork 12, while the second leg 26 constitutes a damping mechanism of the front suspension fork 12. Of course, it will be apparent to those skilled in the bicycle field that the air-spring mechanism can be in the second leg and the damping mechanism can be in the first leg, if needed and/or desired. The air-spring mechanism provides resistance to compression of the suspension fork 12 and releases energy stored during compression to cause the suspension fork 12 to extend, or rebound. The damping mechanism includes an upper damping unit 30 and a lower damping unit 31. The damping units 30 and 31 provide a damping force, which resists both compression and rebound motion, to slow the motion of the suspension fork 12 in either direction.

The first leg 24 includes a left upper tubular element 32 telescopically received in a left lower tubular element 34. In other words, the upper tubular element 32 includes a top portion and a bottom portion, with the bottom portion of the upper tubular element 32 being telescopically disposed within a top portion of the lower tubular element 34 such that the upper tubular element 32 is telescopically movable with respect to the lower tubular element 34. The hollow interiors of the upper and lower tubular elements 32 and 34 form an internal area of the upper and lower tubular elements 32 and 34 that changes in area when the upper and lower tubular elements 32 and 34 are moved together (compression) or moved apart (expansion or rebound).

Similarly, the second leg 26 includes a right upper tubular element 36 telescopically received in a right lower tubular element 38. In other words, the upper tubular element 36 includes a top portion and a bottom portion, with the bottom portion of the upper tubular element 36 being telescopically disposed within a top portion of the lower tubular element 38 such that the upper tubular element 36 is telescopically movable with respect to the lower tubular element 38. The hollow interiors of the upper and lower tubes 36 and 38 form an internal area of the upper and lower tubes 36 and 38 that changes in area when the upper and lower tubes 36 and 38 are moved together (compression) or moved apart (expansion or rebound).

The crown 22 connects the right upper tubular element 32 to the left upper tubular element 36 thereby connecting the first leg 24 to the second leg 26 of the suspension fork 12. Each of the lower tubular elements 34 and 38 includes a drop out 40 for connecting the front wheel 16 to the fork 12. An arch 42 connects the left lower tubular element 34 and the right lower tubular element 38 to provide strength and minimize twisting thereof. In the illustrated embodiment, the left lower tubular element 34, the right lower tubular element 38 and the arch 42 are formed as a unitary piece. However, the left lower tubular element 34, the right lower tubular element 38 and the arch 42 can be separate pieces and connected by a suitable fastening method.

The suspension fork 12 can also be provided with other conventional features. For example, disc brake bosses can be provided on one or both of the lower tubular elements 34 and 38, as needed and/or desired, for mounting a disc brake caliper. Of course, it will be apparent to those skilled in the art from this disclosure that the suspension fork 12 can be configured to mount other types of braking systems as needed and/or desired.

Still referring to FIG. 3, as previously mentioned, the upper tubular elements 32 and 36 are capable of telescopic motion relative to the lower tubular elements 34 and 38, respectively. Each of the lower tubular elements 34 and 38 has a closed (not air-tight) lower end and an open upper end. The lower ends of the upper tubular elements 32 and 36 are received into the open upper ends of the lower tubular elements 34 and 38, respectively. Each of the fork legs 24 and 26 preferably includes a sealing/bushing arrangement positioned between the respective upper tubular elements 32 and 36 and the lower tubular elements 34 and 38 at the location where the upper tubular elements 32 and 36 enter the open end of the lower tubular elements 34 and 38 in a conventional manner. Each of the upper tubular elements 32 and 36 constitutes a first tubular element, while each of the lower tubular elements 34 and 38 constitutes a second tubular element that is telescopically arranged with respect to the corresponding first tubular element.

In this illustrated embodiment, the first leg 24 includes a first bicycle suspension adjustor 44 for selectively controlling a suspension setting of the air-spring mechanism of the front bicycle suspension 12, while the second leg 26 includes a second bicycle suspension adjustor 46 for selectively controlling two different suspension settings of the damping mechanism of the front bicycle suspension 12 in accordance with one illustrated embodiment.

Still referring to FIG. 3, the bicycle suspension adjustor 44 is disposed in the upper end of the upper tubular element 32 and provides an air tight seal for closing off the upper end of the upper tubular element 32. Thus, the bicycle suspension adjustor 44 constitutes a first or upper sealing structure of the air-spring mechanism. A second or lower sealing structure 48 is disposed in the upper tubular element 32 such that an air-tight chamber is formed between in a portion of the upper tubular element 32 between the bicycle suspension adjustor 44 and the lower sealing structure 48. An air filling valve 50 is provided in the bicycle suspension adjustor 44 for supplying pressurized air to the air-tight chamber is formed between in a portion of the upper tubular element 32 between the bicycle suspension adjustor 44 and the lower sealing structure 48. The air filling valve 50 is a conventional valve that is well known in the art, and thus, will not be discussed and/or illustrated in further detail herein, The air-spring mechanism within the first leg 24 is basically formed by providing a piston 51 in the upper tubular element 32 that divides air-tight chamber of the upper tubular element 32 into a positive air spring chamber 52 and a negative air spring chamber 53. The piston 51 is mounted on an upper end of a piston rod 54 that is fixed to the lower tubular element 34. In this way, the piston 51 moves relative to the upper tubular element 32 as the lower tubular element 34 moves relative to the upper tubular element 32. Basically, the positive air spring chamber 52 is formed in the upper tubular element 32 between the bicycle suspension adjustor 44 and the piston 51, while the negative air spring chamber 53 is formed in the upper tubular element 32 formed between the piston 51 and the lower sealing structure 48. The positive air spring chamber 52 can be broadly considered a first air chamber, while the negative air spring chamber 53 can be broadly considered a second air chamber. When the upper and lower tubular elements 32 and 34 are compressed together, the air within the positive air spring chamber 52 of the first leg 24 compresses, while the air within the negative air spring chamber 53 of the first leg 24 expands. Thus, the air spring works by utilizing the characteristic of compressed air to resist further compression. Since the "spring" of the suspension fork 12 is preferably provided by the compressed air rather than a coil of metal the suspension can be made lighter. Also with this type of fork design, the spring rate can easily be adjusted by adjusting the pressure of the air in the spring. This allows the suspension fork 12 to be effectively tuned to a rider's weight. A spring 55 is preferably disposed on the piston rod 54 between the piston 51 and the lower sealing structure 48 for providing a stopper cushion when the front bicycle suspension 12 moves to a fully extended position.

As mentioned above, the bicycle suspension adjustor 44 is disposed in the upper tubular element 32 (e.g., the first tubular element) adjacent the first or upper end of the upper tubular element 32 such that the positive air spring chamber 52 (e.g., a first air chamber) is formed between the piston 51 and the bicycle suspension adjustor 44. Thus, the bicycle suspension adjustor 44 closes the upper end of the upper tubular element 32 to provide a fluid-tight seal between the bicycle suspension adjustor 44 and the inner surface of the upper tubular element 32. Since the top portion of the lower tubular element 34 is telescopically movable with the bottom portion of the upper tubular element 32, an adjustable internal area is formed within the upper and lower tubular elements 32 and 34.

In the illustrated embodiment, an inner tube 56 is coaxially disposed in the upper tubular element 32 to form a communication passageway 58 between the inner tube 56 and the upper tubular element 32, such that the communication passageway 58 interconnects the positive air spring chamber 52 and the negative air spring chamber 53. As discussed below, actuation of bicycle suspension adjustor 44 opens and closes channels in the bicycle suspension adjustor 44 so that the positive air spring chamber 52 is selectively opened and closed with respect to the communication passageway 58.

Referring to FIG. 3, the piston 51 is slidably disposed in the inner tube 56 and separates the positive and negative air-spring chambers 52 and 53 of the first leg 24. In particular, the piston 51 has a seal that contacts the inner surface of the inner tube 56 to create a fluid tight seal therebetween. The piston 51 moves relative to the upper tubular element 32 in response to relative telescopic movement between the upper and lower tubular elements 32 and 34. The piston rod 54 is a rigid rod that supports the piston 51 within the upper tubular element 32 and slidably engages the lower sealing structure 48. In particular, the piston rod 54 has a first or upper end fixedly coupled to the piston 51 with a fluid tight seal therebetween, and a second or lower end fixedly coupled to the lower tubular element 34. Thus, the lower end of the piston rod 54 extends outwardly of the lower end of the upper tubular element 32 (e.g., the first tubular element) such that the lower end of the upper tubular element 32 is spaced from the bottom end of the lower tubular element 34 (e.g., the second tubular element). In other words, the lower tubular element 34 has its upper end telescopically receives in the lower end of the upper tubular element 32 and its lower end fixedly coupled to the lower end of the piston rod 54 so that the piston 51 and the piston rod 54 move with the lower tubular element 34 relative to the upper tubular element 32.

The second or lower sealing structure 48 is secured to the lower end of the inner tube 56 at a location that is spaced upwardly from the lower end of upper tubular element 32. In particular, an internal thread on the lower end of the inner tube 56 engages an external thread of the lower sealing structure 48. The lower sealing structure 48 also has an outer seal that contacts the inner surface of the upper tubular element 32 to create a fluid tight seal therebetween, and has an inner seal that contacts the outer surface of the piston rod 54 to create a fluid tight seal therebetween.

Referring to FIGS. 4 to 12, the details of the bicycle suspension adjustor 44 will now be discussed. In this embodiment, as seen in FIGS. 4 to 8, the bicycle suspension adjustor 44 is mainly provided with a rotational input member 60, an axial output member 62 and a rotation-to-axial movement converting structure 64. The rotational input member 60 is configured to rotate in a rotational direction with respect to the upper tubular element 32. The axial output member 62 is configured to move in an axial direction with respect to the upper tubular element 32. Basically, the rotation-to-axial movement converting structure 64 converts a rotational input of the rotational input member 60 to axial or linear movement of the axial output member 62.

In this illustrated embodiment, as seen in FIGS. 5, 7, 8 and 9, the bicycle suspension adjustor 44 is also provided with a motorized driving unit 66 and an angular rotational detecting device 68. The motorized driving unit 66 is actuated by the control device 18 (FIG. 1). Basically, the motorized driving unit 66 rotates the rotational input member 60, which in turn rotates the rotation-to-axial movement converting structure 64. As mentioned above, the axial output member 62 moved axially or linearly in response to the rotation of the rotation-to-axial movement converting structure 64 by the rotational input member 60. In this illustrated embodiment, the bicycle suspension adjustor 44 is secured to the upper end of the upper tubular element 32 by a fork bolt 70. For example, as illustrated, the fork bolt 70 is threaded into the upper end of the upper end of the upper tubular element 32. The fork bolt 70 is also threaded to the upper end of the inner tube 56 to coaxially support the inner tube 56 with respect to the upper tubular element 32. The lower end of the inner tube 56 is fixed to the lower sealing structure 48 the upper tubular element 32. The lower end of the inner tube 56 is provided with openings that provide fluid communication between the negative air spring chamber 53 and communication passageway 58.

Figure 9:
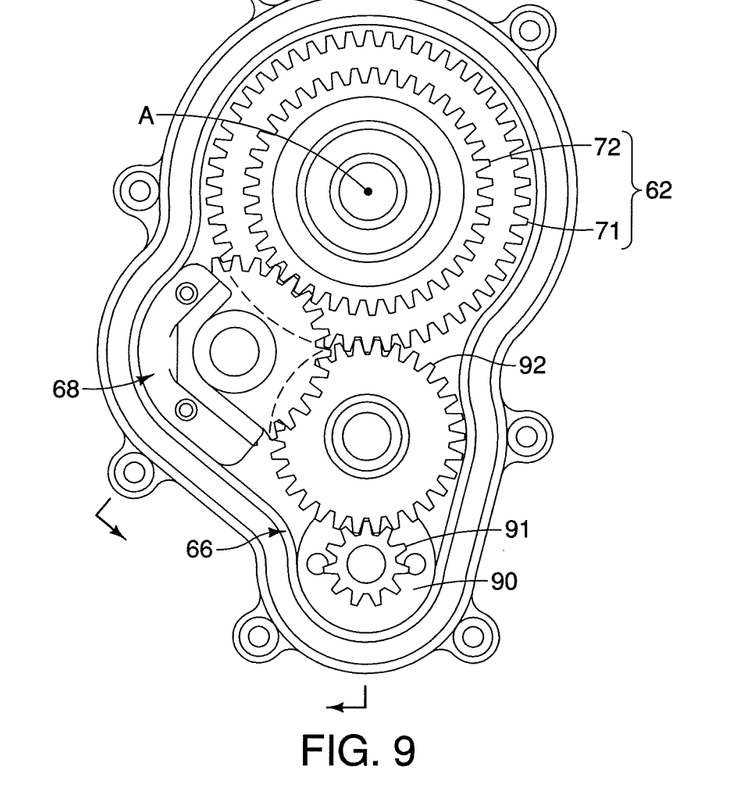
FIG. 9 is a top plan view of the drive unit and the angular rotational detecting device of the bicycle suspension adjustor.

In this illustrated embodiment, the rotational input member 60 is formed by a first gear 71 and a second gear 72. The second gear 72 is fixed to the first gear 71 so that they rotate together as a unit. The first gear 71 is driven (rotated) by the motorized driving unit 66. The second gear 72 rotates the angular rotational detecting device 68 such that the angular rotational detecting device 68 can determine the amount of rotational of the rotational input member 60 (e.g., the gears 71 and 72). Thus, the gears 71 and 72 (e.g., the rotational input member 60) rotate in a rotational direction about a center rotational axis A with respect to the upper tubular element 32. However, the gears 71 and 72 (e.g., the rotational input member 60) are non-movably arranged in the axial direction.

The axial output member 62 moves in an axial direction in response to the rotation of the rotation-to-axial movement converting structure 64 by the rotational input member 60. The axial output member 62 is preferably non-rotatably arranged in the rotational direction about the center rotational axis A. In this illustrated embodiment, the axial output member 62 includes an air valve support 74 and a control rod 76. The air valve support 74 fixedly receives the air filling valve 50. The control rod 76 is fixed to the lower end of the air valve support 74 by a threaded connection. The control rod 76 is provided with an axially extending air inlet bore 76a. The control rod 76 has a center axis that is coincident with the center rotational axis A.

Figure 4:
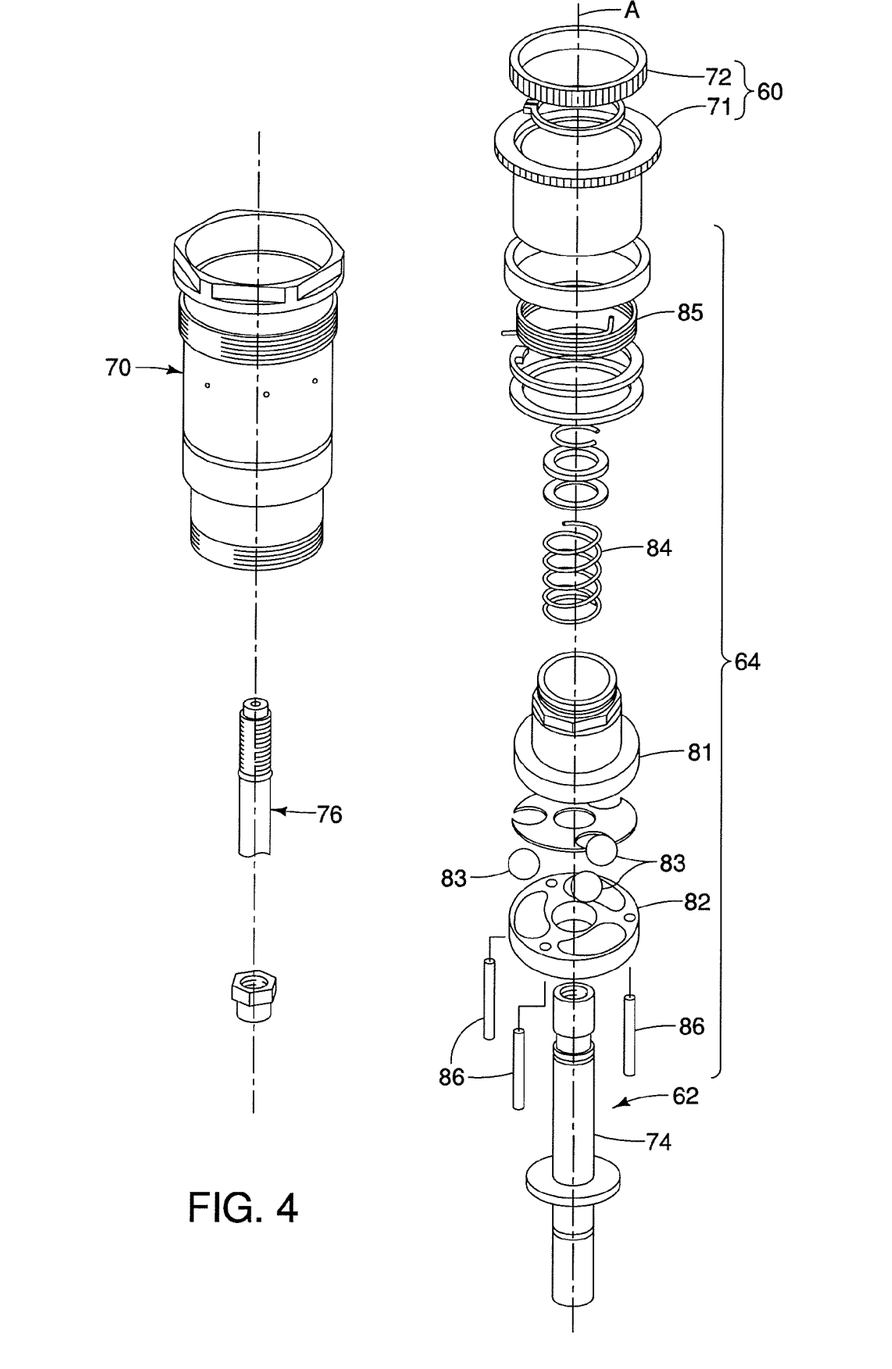
FIG. 4 is an exploded perspective view of the bicycle suspension adjustor of the front suspension of the bicycle illustrated in FIGS. 1 to 3.

As seen in FIG. 4, the rotation-to-axial movement converting structure 64 mainly includes a first converting member 81, a second converting member 82 and a plurality of rolling members 83. In a preferable embodiment, the first converting member 81 is operatively coupled to the rotational input member 60, while the second converting member 82 is operatively coupled to the axial output member 62. The rolling members 83 are operatively disposed between the first and second converting members 81 and 82 for moving the axial output member 62 in an axial direction along the center rotational axis A.

Figure 11:
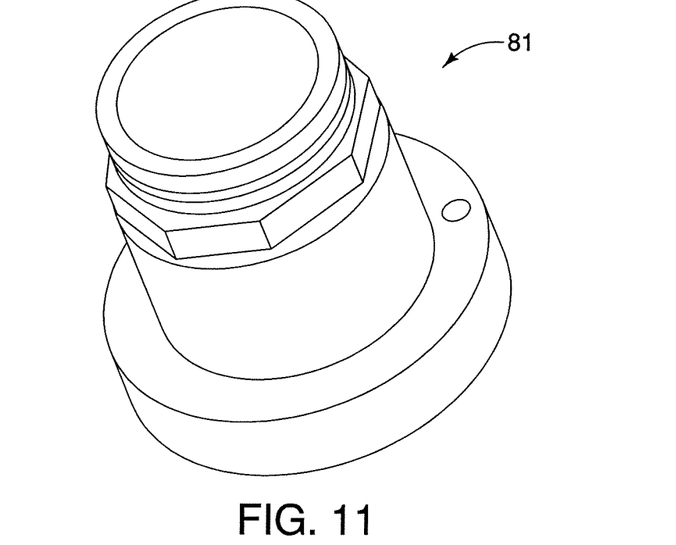
FIG. 11 is a perspective view of the first converting member of the bicycle suspension adjustor in accordance with the illustrated embodiment.
Figure 12:
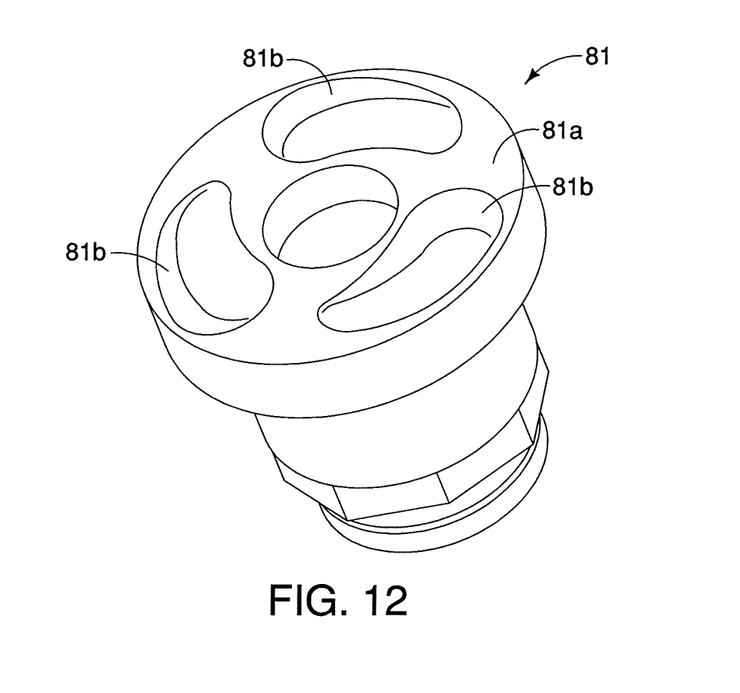
FIG. 12 is another perspective view of the first converting member of the bicycle suspension adjustor in accordance with the illustrated embodiment.

Preferably, the first converting member 81 is operatively coupled to the rotational input member 60 to rotate about the center rotational axis A. In other words, the control rod 76 has its center axis coincident with the center rotational axis A of the first converting member 81. The first converting member 81 is adapted to non-rotatably attached to a portion of the driving unit 66, as discussed below. The first converting member 81 has a first camming surface 81a which contacts with the rolling members 83. The first camming surface 81a includes three ramp-shaped camming slots 81b that are engaged with the rolling members 83. These camming slots 81b are preferably arcuate slots that curve about the center rotational axis A of the first converting member 81. These camming slots 81b have an angled bottom surface that is preferably sloped approximately fifteen degrees relative to a plane passing perpendicularly through the axis of rotation of the first converting member 81. Thus, the first camming surface 81a with the ramp-shaped camming slots 81b constitutes an input cam of the first converting member 81. Accordingly, when the first converting member 81 is rotated, the rolling members 83 will move in a circumferential direction within the camming slots 81b, such that all of the rolling members 83 are located at the same position within the camming slots 81b to axially move the second converting member 82. Preferably, the first converting member 81 is axially biased toward the second converting member 82. The first converting member 81 can be further rotationally biased in the rotational direction such that the first converting member 81 moves away from the second converting member 82 in the axial direction.

Figure 13:
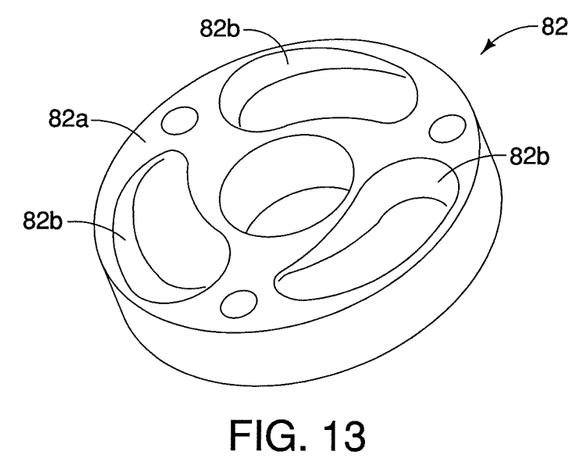
FIG. 13 is a perspective view of the second converting member of the bicycle suspension adjustor in accordance with the illustrated embodiment.
Figure 14:
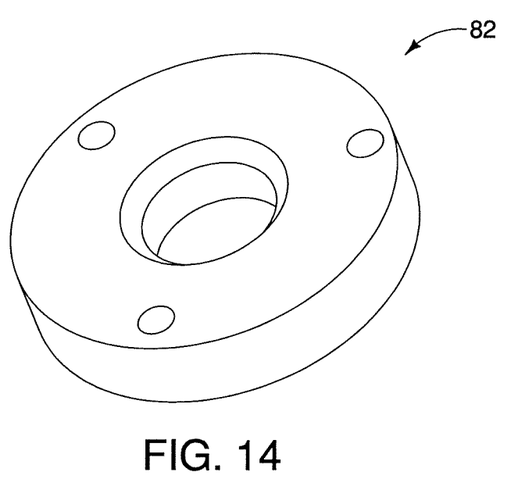
FIG. 14 is another perspective view of the second converting member of the bicycle suspension adjustor in accordance with the illustrated embodiment.

The second converting member 82 moves in the axial direction in response to a rotational movement of the first converting member 81. The axial output member 62 moves in the axial direction in response to an axial movement of the second converting member 82. The second converting member 82 faces the first converting member 81. Preferably, the second converting member 82 is operatively coupled to the axial output member 62. The second converting member 82 is a disc shaped member with a cylindrical peripheral surface. The second converting member 82 has a second camming surface 82a which contacts with the rolling members 83. The second camming surface 82a includes three ramp-shaped camming slots 82b that are engaged with the rolling members 83. These camming slots 82b have an angled bottom surface that is preferably sloped approximately fifteen degrees relative to a plane passing perpendicularly through the axis of rotation of the second converting member 82. Thus, the second camming surface 82a with the ramp-shaped camming slots 82b constitutes an output cam of the second converting member 82.

In the illustrated embodiment, the rolling members 83 include three balls that are circumferentially about the rotational axis of the first converting member 81. While three balls are illustrated, fewer or more rolling members 83 or balls can be used as needed and/or desired. The rolling members 83 are operatively disposed between the first and second converting members 81 and 82. In particular, the rolling members 83 are in rolling contact with the ramp-shaped camming slots 81b and 82b the first and second converting members 81 and 82, respectively, so that the rolling members 83 induce relative displacement with respect to both of the first and second converting members 81 and 82 as the rotational input member 60 rotates the first converting member 81 in response to a rotational movement of the rotational input member 60 with the one of the first and second converting members 81 and 82 moving in the axial direction due to a rotational movement of the first converting member 81. Thus, the axial output member 62 moves in the axial direction due to the axial movement of the second converting member 82. Because frictional resistance to rotate the rotational input member 60 is less in such a conventional structure as described above, the rotation-to-axial converting structure 64 of the illustrated embodiment can be suitable for a motor-drive suspension adjustor.

The rotation-to-axial movement converting structure 64 is also preferably provided with a first biasing element or preset spring 84 that biases the first converting member 81 axially towards the second converting member 82. A second biasing element or return spring 85 is preferably arranged to rotationally bias the first converting member 81 in the rotational direction such that the first converting member 81 moves away from the second converting member 82 in the axial direction. Basically, the rotation-to-axial movement converting structure 64 is located in an internal bore of the left leg 24 and expands in an axial direction in response to actuation of the motorized driving unit 66. In particular, rotation of the first converting member 81 in response to actuation of the motorized driving unit 66 causes the second converting member 82 to move in an axial direction against the force of the return spring 85.

The preset spring 84 is arranged to bias the first converting member 81 toward the second converting member 82 so that the first and second converting members 81 and 82 do not move away from each other. If the first and second converting members 81 and 82 move away from each other, the rotation-to-axial movement converting structure 64 would not operate properly in this illustrated embodiment. However, the return spring 85 is provided to counteract the preset spring 84. Without the return spring 85, the preset spring 84 would undesirably move the first and second converting members 81 and 82 toward each other due to the rolling contact of the rolling members 83 between the first and second converting members 81 and 82. Therefore, to avoid this situation, the return spring 85 is provided to bias the first converting member 81 to move away from the second converting member 82 so that the biasing forces of the springs 84 and 85 are counterbalanced. If one or both of the camming slots 81*b* and 82*b* are formed to be a stepped slot so that the preset spring 84 does not undesirably move the first and second converting members 81 and 82 toward each other by resisting against the biasing force of the preset spring 84, the return spring 85 can be omitted.

Three guide pins 86 are provided to prevent the second converting member 82 from rotating with respect to the fork bolt 70 during rotational of the first converting member 81. In particular, the guide pins 86 are fixed to the fork bolt 70 with the second converting member 82 slidably supported for movement in the axial direction. Of course, it will be apparent from this disclosure that other arrangements can be used to prevent rotation of the second converting member 82 from rotating with respect to the fork bolt 70.

In this embodiment, the driving unit 66 includes a drive motor 90 with an output gear 91 and an intermediate gear 92. The drive motor 90 is a reversible electric motor with the output gear 91 mounted to the output shaft of the drive motor 90. The teeth of the intermediate gear 92 are engaged with the teeth of the output gear 91 and the first gear 71 to transmit rotation from the output gear 91 to the first gear 71. Thus, the drive motor 90 is operatively coupled to the rotational input member 60 to rotate the rotational input member 60 in the rotational direction via the gears 91 and 92. While the rotational input member 60 is illustrated with as being operated via the driving motor 90 that is mounted on the upper end of the first leg 24, other types of actuators can be used such as a manual (hand operated) actuator.

Figure 10:
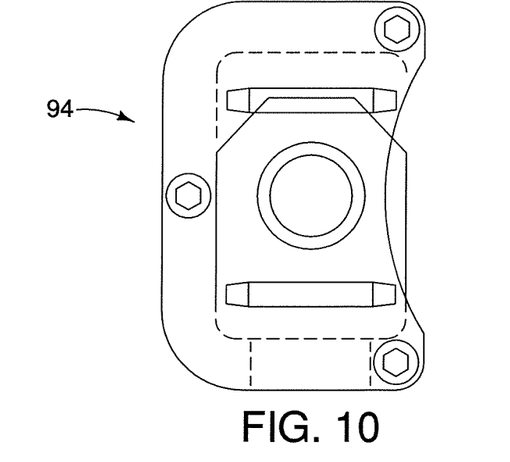
FIG. 10 is a top plan view of potentiometer of the angular rotational detecting device of the bicycle suspension adjustor.

In this embodiment, the angular rotational detecting device 68 includes an input gear 93 and a potentiometer 94. The angular rotational detecting device 68 is operatively coupled to the second gear 72 of the rotational input member 60. In particular, the teeth of the input gear 93 are engaged with the teeth of the second gear 72. The angular rotation of the input gear 93 is measured by the potentiometer 94. In other words, the potentiometer 94 of the angular rotational detecting device 68 measures an amount of rotation of the rotational input member 60 via the input gear 93 in response to the rotational movement of the rotational input member 60.

Figure 5:
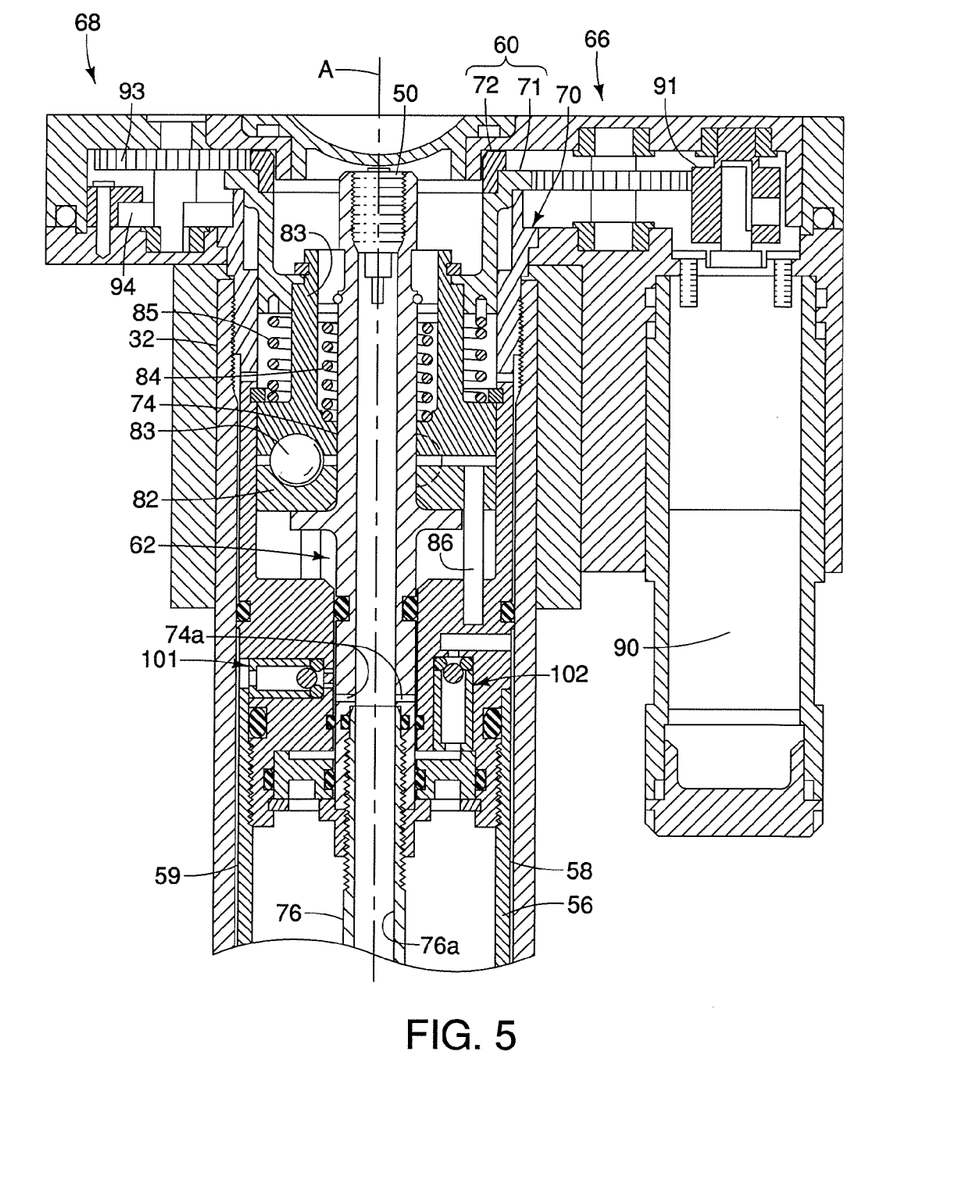
FIG. 5 is a longitudinal cross sectional view of an upper portion of the left leg of the bicycle suspension adjustor showing the bicycle suspension adjustor in a first (top) operating position in which the front suspension is in a short-stroke position and the axial output member of the bicycle suspension adjustor is in a first axial position.
Figure 6:
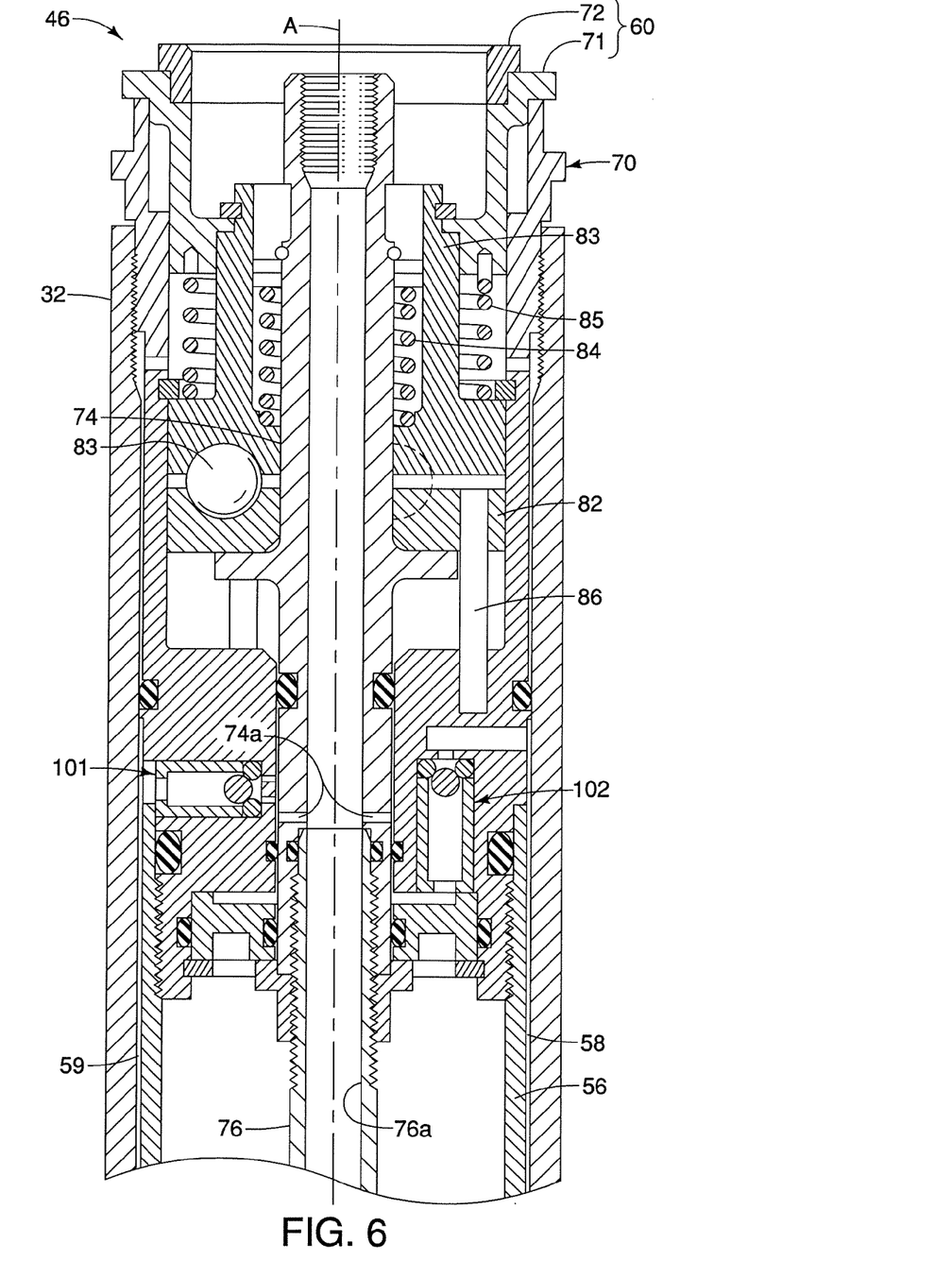
FIG. 6 is a longitudinal cross sectional view of an upper portion and a middle portion of the left leg of the bicycle suspension adjustor showing the bicycle suspension adjustor in the first (top) operating position in which the front suspension is in the short-stroke position and the axial output member of the bicycle suspension adjustor is in the first axial position.

In this illustrated embodiment, as seen In FIG. 3, two check valves 101 and 102 are provided in the fork bolt 70 and another check valve 103 is provided in the lower sealing structure 48. The check valves 101, 102 and 103 control the flow of the compressed air depending on the axial position of the air valve support 74 and the control rod 76 of the axial output member 62. In other words, the axial output member 62 selectively interconnects the positive air spring chamber 52 and the negative air spring chamber 53 via the communication passageway 58. The control rod 76 cooperates with the check valves 101 and 102 to form a stroke adjustment arrangement between a short-stroke position and a long-stroke position. In the short-stroke position, air can flow As seen in FIGS. 5 and 6, when the air valve support 74 and the control rod 76 of the axial output member 62 are in a first axial position, the stroke adjustment arrangement can be in the short-stroke position. In the first axial position, the air valve support 74 and the control rod 76 of the axial output member 62 are arranged such that air can flow from the positive air spring chamber 52 toward the negative air spring chamber 53 until the stroke adjustment arrangement is in the short-stroke position while air can not flow from the negative air spring chamber 53 toward the positive air spring chamber 52. More specifically, an air channels 74*a* of the air valve support 74 are positioned such that air passing through the check valve 102 cannot flow through the air channels 74*a* of the air valve support 74 and air passing through the check valve 101 can flow through the air channel 74*a* of the air valve support 74 when the air valve support 74 and the control rod 76 of the axial output member 62 are in the first axial position as seen in FIGS. 5 and 6. Thus, air can flow from the positive air spring chamber 52 toward the negative air spring chamber 53 through the check valve 101 until the stroke adjustment arrangement is positioned in the short-stroke position as a result of compressing the upper tubular element 32 into the lower tubular element 34 by a user.

Figure 7:
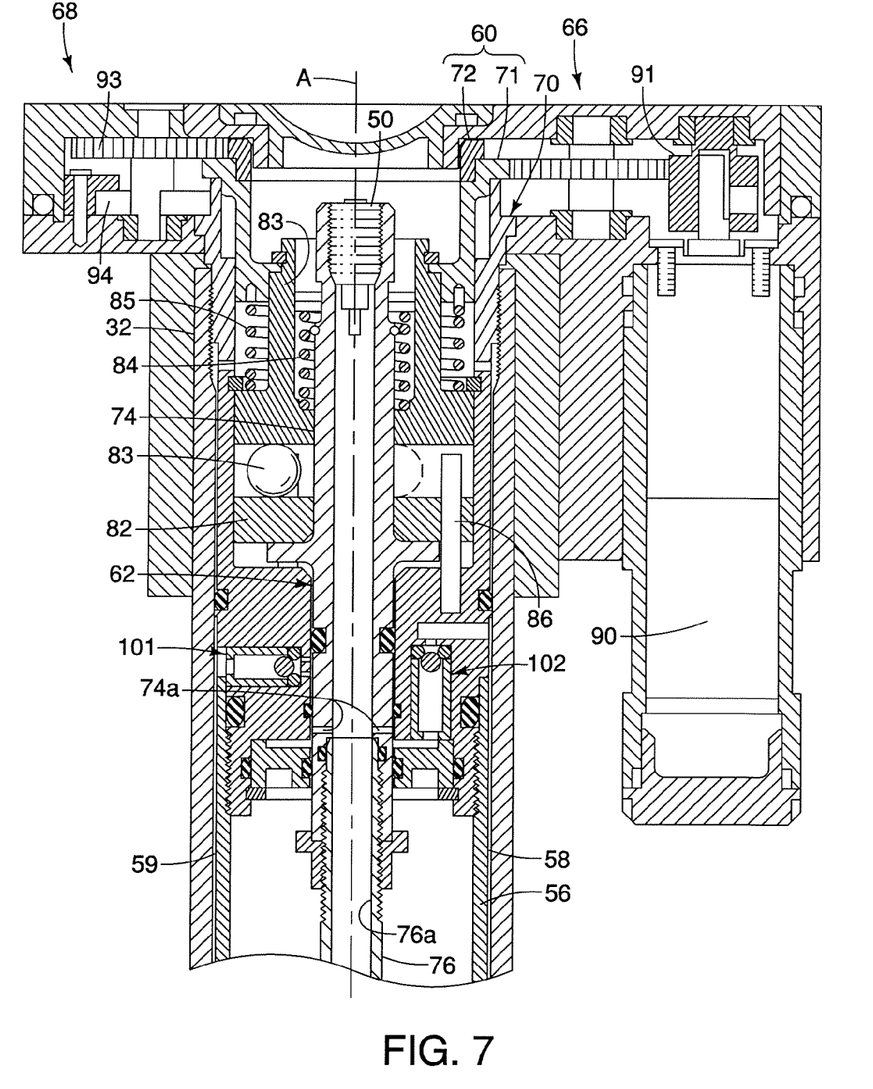
FIG. 7 is a longitudinal cross sectional view of an upper portion of the left leg of the bicycle suspension adjustor showing the bicycle suspension adjustor in a second (bottom) operating position in which the front suspension is in a long-stroke position and the axial output member of the bicycle suspension adjustor is in a second axial position.
Figure 8:
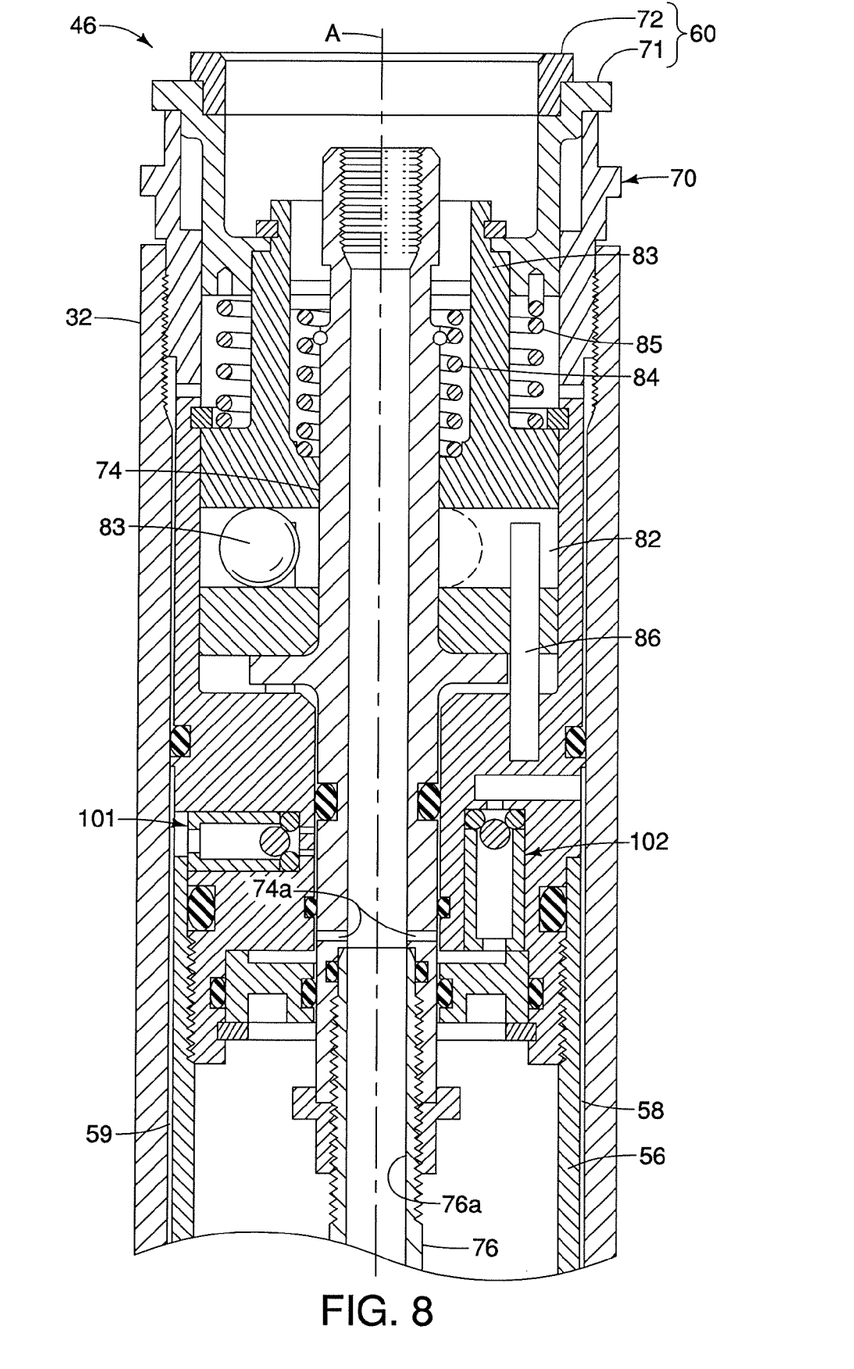
FIG. 8 is a longitudinal cross sectional view of an upper portion and a middle portion of the left leg of the bicycle suspension adjustor showing the bicycle suspension adjustor in the second (bottom) operating position in which the front suspension is in the long-stroke position and the axial output member of the bicycle suspension adjustor is in the second axial position.

As seen in FIGS. 7 and 8, when the control rod 76 of the axial output member 62 is in a second axial position that is different from the first axial position, the stroke adjustment arrangement is in the long-stroke position. In the second axial position, the air valve support 74 and the control rod 76 of the axial output member 62 are arranged such that air can flow from the negative air spring chamber 53 toward the positive air spring chamber 52 until the stroke adjustment arrangement is in the long-stroke position while air can not flow from the positive air spring chamber 52 toward the negative air spring chamber 53. More specifically, the air channels 74*a* of the air valve support 74 are positioned such that air passing through the check valve 102 can flow through the air channels 74*a* of the air valve support 74 and air passing through the check valve 101 can not flow through the air channel 74*a* of the air valve support 74 when the air valve support 74 and the control rod 76 of the axial output member 62 are in the second axial position as seen in FIGS. 7 and 8. Thus, air can flow from the negative air spring chamber 53 toward the positive air spring chamber 52 through the check valve 102 such that the stroke adjustment arrangement can be automatically positioned in the long-stroke position due to air-pressure difference between the positive air spring chamber 52 and the negative air spring chamber 53.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the bicycle suspension, the following directional terms "upward," "downward," "vertical" and "horizontal" as well as any other similar directional terms refer to those directions of a bicycle equipped with the bicycle suspension. Accordingly, these terms, as utilized to describe the bicycle suspension should be interpreted relative to a bicycle equipped with the bicycle suspension as used in the normal riding position. Finally, terms of degree such as "substantially", "about" and "approximately" as used herein mean a reasonable amount of deviation of the modified term such that the end result is not significantly changed.

While only a selected embodiment has been chosen to illustrate the present invention, it will be apparent to those skilled in the art from this disclosure that various changes and modifications can be made herein without departing from the scope of the invention as defined in the appended claims. For example, the bicycle suspension adjustor according to the present invention can also be used for a damping force adjustment arrangement. In addition, the bicycle suspension adjustor according to the present invention may be used for an inverted-type bicycle suspension. Furthermore, the foregoing descriptions are provided for illustration only, and not for the purpose of limiting the invention as defined by the appended claims and their equivalents.

What is claimed is:

1. A bicycle suspension adjustor comprising:
    a rotational input member configured to rotate in a rotational direction;
    an axial output member configured to move in an axial direction; and
    a rotation-to-axial movement converting structure including a first converting member operatively coupled to the rotational input member, a second converting member facing the first converting member, and at least one rolling member operatively disposed between the first and second converting members, one of the first and second converting members operatively coupled to the axial output member, the first and second converting members have first and second axial end faces, respectively, that face each other in opposite axial directions, at least one of the first and second axial end faces of the first and second converting members having a camming surface which contacts with the at least one rolling member,
    the at least one rolling member being in rolling contact with the first and second converting members so that the at least one rolling member induces relative displacement with respect to both of the first and second converting members as the rotational input member rotates the first converting member in response to a rotational movement of the rotational input member with the one of the first and second converting members moving in the axial direction due to a rotational movement of the first converting member, and with the axial output member moving in the axial direction due to an axial movement of the one of the first and second converting members.

2. The bicycle suspension adjustor according to claim 1, wherein
    the second converting member is operatively coupled to the axial output member, the second converting member moves in the axial direction in response to a rotational movement of the first converting member, and the axial output member moves in the axial direction in response to an axial movement of the second converting member.

3. The bicycle suspension adjustor according to claim 1, wherein
    each of the first and second converting members includes the camming surface which contacts with the at least one rolling member.

4. The bicycle suspension adjustor according to claim 3, wherein
    the camming surfaces each includes at least one ramp-shaped camming slot that is engaged with the at least one rolling member.

5. The bicycle suspension adjustor according to claim 1, wherein
    the camming surface includes at least one ramp-shaped camming slot that is engaged with the at least one rolling member.

6. The bicycle suspension adjustor according to claim 1, wherein
    the at least one rolling member includes a plurality of rolling members which are shaped as balls, and
    the camming surface includes a plurality ramp-shaped camming slots that are respectively engaged with the balls.

7. A bicycle suspension adjustor comprising:
    a rotational input member configured to rotate in a rotational direction;
    an axial output member configured to move in an axial direction; and
    a rotation-to-axial movement converting structure including a first converting member operatively coupled to the rotational input member, a second converting member facing the first converting member, and at least one rolling member operatively disposed between the first and second converting members, one of the first and second converting members operatively coupled to the axial output member, at least one of the first and second converting members having a camming surface which contacts with the at least one rolling member and having a center rotational axis, the camming surface facing in an axial direction, and including a camming slot that curves about the center rotational axis,
    the at least one rolling member being in rolling contact with the first and second converting members on that the at least one rotting member induces relative displacement with respect to both of the first and second converting members as the rotational input member rotates the first converting member in response to a rotational movement of the rotational input member with the one of the first and second converting members moving in the axial direction due to a rotational movement of the first converting member, and with the axial output member moving in the axial direction due to an axial movement of the one of the first and second converting members,
wherein
    the first converting member is axially biased toward the second converting member.

8. The bicycle suspension adjustor according to claim 7, wherein
the first converting member is further rotationally biased in the rotational direction such that the first converting member moves away from the second converting member in the axial direction.

9. The bicycle suspension adjustor according to claim 1, wherein
the rotational input member is non-movably arranged in the axial direction.

10. The bicycle suspension adjustor according to claim 1, wherein
the axial output member is non-rotatably arranged in the rotational direction.

11. The bicycle suspension adjustor according to claim 1, wherein
the axial output member includes a control rod with an axially extending air inlet bore.

12. The bicycle suspension adjustor according to claim 1, wherein
the control rod has a center axis that is coincident with a rotational axis of the first converting member.

13. The bicycle suspension adjustor according to claim 1, further comprising
a drive motor operatively coupled to the rotational input member to rotate the rotational input member in the rotational direction.

14. The bicycle suspension adjustor according to claim 1, further comprising
an angular rotational detecting device operatively coupled to the rotational input member, with the angular rotational detecting device measuring an amount of rotation of the rotational input member in response to the rotational movement of the rotational input member.

15. The bicycle suspension adjustor according to claim 1, further comprising
a stroke adjustment arrangement controlling air between a first chamber and a second chamber, the stroke adjustment arrangement establishing a short-stroke position while the axial output member is in a first axial position and a long-stroke position while the axial output member is in a second axial position that is different from the first axial position.

16. A bicycle suspension adjustor comprising:
a rotational input member configured to rotate in a rotational direction;
an axial output member configured to move in an axial direction; and
a rotation-to-axial movement converting structure including a first converting member operatively coupled to the rotational input member, a second converting member facing the first converting member, and at least one rolling member operatively disposed between the first and second converting members, one of the first and second converting members operatively coupled to the axial output member, at least one of the first and second converting members having a camming surface which contacts with the at least one rolling member,
the axial output member including a control rod with an axially extending air inlet bore that passes axially through the first and second converting members,
the at least one rolling member being in rolling contact with the first and second converting members so that the at least one rolling member induces relative displacement with respect to both of the first and second converting members as the rotational input member rotates the first converting member in response to a rotational movement of the rotational input member with the one of the first and second converting members moving in the axial direction due to a rotational movement of the first converting member, and with the axial output member moving in the axial direction due to an axial movement of the one of the first and second converting members.

* * * * *